United States Patent
Blasco Allue et al.

(10) Patent No.: US 7,958,335 B2
(45) Date of Patent: Jun. 7, 2011

(54) MULTIPLE INSTRUCTION SET DECODING

(75) Inventors: Conrado Blasco Allue, Austin, TX (US); Glen Andrew Harris, Austin, TX (US); Stephen John Hill, Austin, TX (US)

(73) Assignee: ARM Limited, Cambridge (GB)

( * ) Notice: Subject to any disclaimer, the term of this patent is extended or adjusted under 35 U.S.C. 154(b) by 1216 days.

(21) Appl. No.: 11/197,521

(22) Filed: Aug. 5, 2005

(65) Prior Publication Data
US 2007/0033383 A1   Feb. 8, 2007

(51) Int. Cl.
G06F 9/30   (2006.01)

(52) U.S. Cl. .......................... 712/209; 712/212
(58) Field of Classification Search .......... 712/209, 712/212
See application file for complete search history.

(56) References Cited

U.S. PATENT DOCUMENTS

| | | | | |
|---|---|---|---|---|
| 5,568,646 A | * | 10/1996 | Jaggar | 712/209 |
| 5,790,824 A | * | 8/1998 | Asghar et al. | 712/209 |
| 5,881,279 A | * | 3/1999 | Lin et al. | 712/244 |
| 2002/0004897 A1 | * | 1/2002 | Kao et al. | 712/227 |
| 2004/0172519 A1 | * | 9/2004 | Nakajima | 712/209 |
| 2004/0255097 A1 | * | 12/2004 | Seal et al. | 712/209 |

OTHER PUBLICATIONS

Hennessy, John, Patterson, David. "Computer Architecture: A Quantitative Approach" Morgan Kaufmann, pp. 1-1141, May 17, 2002.*

* cited by examiner

Primary Examiner — Jacob Petranek
(74) Attorney, Agent, or Firm — Nixon & Vanderhye P.C.

(57) ABSTRACT

A method and a data processing apparatus operable to process instructions from a plurality of instruction sets, the plurality of instruction sets each sharing a sub-set of common instructions and each having a remaining set of instructions is disclosed. The data processing apparatus comprises: a plurality of decode units, each decode unit being operable to only decode the remaining set of instructions from a corresponding one of the plurality of instruction sets; and a common decode unit operable to decode a number of the sub-set of common instructions from each of the plurality of instruction sets. This enables the common instructions from each instruction set to be decoded by the common decode unit. Hence, the logic which would otherwise be duplicated in each of the individual decode units for each instruction set can be removed from those decode units and provided just once in the common decode unit. Accordingly, this can significantly reduce the amount of logic duplicated in the decoder units which, in turn, reduces the amount chip area required to support decoding and reduces power consumption. Also, since the decode units are no longer required to support the decoding of such a high number of different instructions, the complexity of each decode unit can be reduced, which can result in increased performance during decode.

17 Claims, 5 Drawing Sheets

| | 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|---|---|---|---|---|---|---|---|---|---|---|---|---|---|---|---|
| Data processing: A | 1 | 1 | 1 | 1 | 0 | 0 | 1 | U | x | x | x | x | x | x | x | x | x | x | x | x | x | x | x | x | x | x | x | x | x | x | x | x |
| Data processing: B | 1 | 1 | 1 | U | 1 | 1 | 1 | 1 | x | x | x | x | x | x | x | x | x | x | x | x | x | x | x | x | x | x | x | x | x | x | x | x |
| Load and store registers: A | cond | | | | 1 | 1 | 0 | 1 | x | x | x | x | x | x | x | x | x | x | x | x | 1 | 0 | 1 | 1 | x | x | x | x | x | x | x | x |
| Load and store registers: B | 1 | 1 | 1 | 0 | 1 | 1 | 0 | x | x | x | x | x | x | x | x | x | x | x | x | x | 1 | 0 | 1 | 1 | x | x | x | x | x | x | x | x |
| Load and store, elements and structures: A | 1 | 1 | 1 | 1 | 0 | 1 | 0 | 0 | x | x | 0 | x | x | x | x | x | x | x | x | x | x | x | x | x | x | x | x | x | x | x | x | x |
| Load and store, elements and structures: B | 1 | 1 | 1 | 1 | 1 | 0 | 0 | 1 | x | x | 0 | x | x | x | x | x | x | x | x | x | x | x | x | x | x | x | x | x | x | x | x | x |
| 8-bit, 16-bit, and 32-bit data transfer between ARM and ASE: A | cond | | | | 1 | 1 | 1 | 0 | x | x | x | x | x | x | x | x | x | x | x | x | 1 | 0 | 1 | 1 | x | x | x | 1 | x | x | x | x |
| 8-bit, 16-bit, and 32-bit data transfer between ARM and ASE: B | 1 | 1 | 1 | 0 | 1 | 1 | 1 | 0 | x | x | x | x | x | x | x | x | x | x | x | x | 1 | 0 | 1 | 1 | x | x | x | 1 | x | x | x | x |
| 64-bit data transfer between ARM and ASE: A | cond | | | | 1 | 1 | 0 | 0 | 0 | 0 | 1 | 0 | x | x | x | x | x | x | x | x | 1 | 0 | 1 | 1 | 0 | 0 | x | 1 | x | x | x | x |
| 64-bit data transfer between ARM and ASE: B | 1 | 1 | 1 | 0 | 1 | 1 | 0 | 0 | 0 | 0 | 1 | 0 | x | x | x | x | x | x | x | x | 1 | 0 | 1 | 1 | 0 | 0 | x | 1 | x | x | x | x |

FIG. 3

```
CommonA= ~ISet_BnA &
   (
      (
         (InstructionA[31:28] == 4'b1111) &
         (InstructionA[27:25] == 3'b001)
      ) |
      (
         (InstructionA[31:28] == 4'b1111) &
         (InstructionA[27:24] == 4'b0100) &
         (InstructionA[20] == 1'b0)
      ) |
      (InstructionA[27:25] == 3'b110) |
      (InstructionA[27:24] == 4'b1110)
   );

CommonB1 = (ISet_BnA &
            (InstructionB[15:13] == 3'b111 &
            (InstructionB[11:08] == 4'b1111)
         );

CommonB2 = (ISet_BnA &
            (InstructionB[15:12] == 4'b1111) &
            (InstructionB[11:08] == 4'b1001) &
            (InstructionB[04] == 1'b0)
         );

CommonB3 = (ISet_BnA &
            (
               (InstructionB[15:13] == 3'b111) &
               (
                  (InstructionB[11:09] == 3'b110) |
                  (InstructionB[11:08] == 4'b1110)
               )
            )
         );

CommonAB = CommonA| CommonB1 | CommonB2 | CommonB3;
```

FIG. 4

```
Common_Inst[31:29] =   ISet_BnA ? inst_t_d0[15:13] : inst_a_d0[31:29];

Common_Inst[28]    =   (ISet_BnA ? inst_t_d0[12] : inst_a_d0[28]) |
                       CommonB1;

Common_Inst[27]    =   (ISet_BnA ? inst_t_d0[11] : inst_a_d0[27]) &
                       ~(CommonB2 | CommonB1);

Common_Inst[26]    =   (
                         (ISet_BnA ? inst_t_d0[10] : inst_a_d0[26]
                       ) |
                         CommonB2
                       ) & ~CommonB1;

Common_Inst[25]    =   ISet_BnA ? inst_t_d0[09] : inst_a_d0[25];

Common_Inst[24]    =   (
                         (ISet_BnA ? inst_t_d0[08] : inst_a_d0[24]
                       ) &
                         ~CommonB1 & ~CommonB2
                       ) |
                       (inst_t_d0[12] & CommonB1
                       ) & ~CommonB2;

Common_Inst[23:16] =   ISet_BnA ? inst_t_d0[07:00] : inst_a_d0[23:16];

Common_Inst[15:00] =   ISet_BnA ? inst_t_d0[31:16] : inst_a_d0[15:00];
```

FIG. 5

MULTIPLE INSTRUCTION SET DECODING

FIELD OF THE INVENTION

The present invention relates to techniques for decoding instructions. In particular, embodiments of the present invention relate to techniques for decoding instructions in a data processing apparatus operable to process instructions from a plurality of instruction sets.

BACKGROUND OF THE INVENTION

It is known to provide a data processing apparatus which is operable to support the processing of more than one instruction set. Supporting more than one instruction set may occur for various reasons. For example, one instruction set supported by the data processing apparatus may be optimised to be particularly speed efficient, whereas another instruction set supported by the data processing apparatus may be optimised to provide high code density.

In any event, when a data processing apparatus is required to support multiple instruction sets, for whatever reason, instructions from the different instruction sets need to be decoded for execution.

It is known to provide additional instruction decoders for each additional instruction set to be processed by the data processing apparatus. In this way, further instruction sets are included to be processed by the data processing apparatus, as required, and the further decoders are selected to enable those instruction sets to be correctly decoded so that correct control signals may be provided to the data processing apparatus to cause correct execution of the intended instruction.

Generally, when multiple instruction sets are provided, information other than the instruction itself would typically need to be provided to enable a determination be made regarding which instruction set the instruction belongs. This is because there may be at least some identical instruction encodings that decode to indicate different operations for different instruction sets. Accordingly, some other state information is typically required in order to determine which instruction set is currently selected and therefore which operation to perform.

Adding instructions sets is costly in terms of area, speed and power as, from a microprocessor architecture perspective, an entire additional decoder is added per instruction set.

It is desired to provide an improved technique for decoding instructions from a plurality of instruction sets.

SUMMARY OF THE INVENTION

Viewed from a first aspect, the present invention provides a data processing apparatus operable to process instructions from a plurality of instruction sets, the plurality of instruction sets each sharing a sub-set of common instructions and each having a remaining set of instructions, the data processing apparatus comprising: a plurality of decode units, each decode unit being operable to only decode the remaining set of instructions from a corresponding one of the plurality of instruction sets; and a common decode unit operable to decode a number of the sub-set of common instructions from each of the plurality of instruction sets.

The present invention recognises that it is often the case that, when a plurality of instruction sets are provided, a subset of common instructions are shared by that plurality of instruction sets. For example, each instruction set may support the same particular arithmetic or data transfer instruction. Hence, it will be appreciated that each decode unit will contain logic which separately decodes these instructions from different instruction sets and generates exactly the same control signals in each decode unit for use by the execute units.

Hence, the present invention recognises that, within each decode unit, logic duplication will occur.

Accordingly, a common decode unit is provided which is operable to decode a number of the instructions in the subset of common instructions from each of the plurality of instruction sets. In this way, it will be appreciated that the common instructions for each instruction set can be decoded by the common decode unit. Hence, the logic which would otherwise be duplicated in each of the decode units can be removed from those decode units and provided just once in the common decode unit. Accordingly, it will be appreciated that this can significantly reduce the amount of logic duplicated in the decoder units which, in turn, reduces the amount chip area required to support decoding and reduces power consumption. Also, since the decode units are no longer required to support the decoding of such a high number of different instructions, the complexity of each decode unit can be reduced, which can result in increased performance during decode.

In embodiments, the number of the sub-set of common instructions comprises all of the sub-set of common instructions.

Hence, the common decode unit may be operable to decode the sub-set of common instructions from each of the plurality of instruction sets.

In embodiments, the sub-set of common instructions are coded identically in each of the plurality of instruction sets.

Hence, in the event that each common instruction in each instruction set is coded in exactly the same way, the common decode unit can simply decode this instruction irrespective of which instruction set that instruction came from.

However, in embodiments where the sub-set of common instructions are coded differently in each of the plurality of instruction sets, instruction remapping logic is provided to rearrange instructions from the sub-set of common instructions into a common coded format for decoding by the common decode unit.

Accordingly, when the common instructions between the instruction sets are not identical then remapping logic will rearrange those instructions so that irrespective of which instruction set the instruction was derived from, the same coded instruction is provided to the common decode unit. It will be appreciated that this could be achieved in a number of ways, for example, one instruction set could be identified as a preferred encoded arrangement and all other equivalent instructions from other instruction sets could be encoded by the remapping logic in the same way.

In embodiments, portions of instructions in the sub-set of common instructions are coded differently in each of the plurality of instruction sets and instruction remapping logic is provided to rearrange the portions of instructions from the sub-set of common instructions into a common coded format for decoding by the common decode unit.

Accordingly, only portions of each equivalent instruction from the different instruction sets may vary between the instruction sets and, accordingly, the remapping logic need only rearrange those portions of each common instruction in order that a common coded format of the common instructions may be provided for decoding by the common decode unit.

In embodiments, the remapping logic is provided with an indication of which of the plurality of instruction sets a common instruction belongs to.

Hence, the remapping logic may be provided with an indication of which instruction set that common instruction belongs to in order that the correct remapping can occur.

In embodiments, the data processing apparatus comprises common sub-set detection logic operable to provide an indication of when an instruction from the sub-set of common instructions is detected.

In embodiments, the data processing apparatus comprises multiplex logic operable to receive decoded instructions from each of the plurality of decode units and from the common decode unit, the multiplex logic being operable to output a decoded instruction from the common decode unit for execution by execute logic in response to the indication.

Hence, the multiplex logic receives decoded instructions from all the decode units and the common decode unit and when an indication is received that the instruction is from the subset of common instructions the multiplex logic provides the decoded common instruction for execution by the execute logic.

In embodiments, the data processing apparatus comprises multiplex logic operable to receive decoded instructions from each of the plurality of decode units; part execute logic coupled to the multiplex logic for executing the remaining set of instructions from each of the plurality of instruction sets; and part instruction execute logic coupled to the common decode unit for executing the common sub-set of instructions.

Accordingly, the part execute logic coupled to the common decode unit for executing does not require the cost of the multiplex logic. Hence, it will be appreciated that in the same way that the arrangement of the logic which performs the decoding function of instructions is simplified through this approach, the arrangement of the execute logic may be similarly simplified.

In embodiments, the plurality of instruction sets share a plurality of sub-sets of common instructions and the data processing apparatus comprises a plurality of common decode units operable to decode a corresponding one of the plurality of sub-sets of common instructions from each of the plurality of instruction sets.

Viewed from a second aspect, the present invention provides a method of processing instructions from a plurality of instruction sets, the plurality of instruction sets each sharing a sub-set of common instructions and each having a remaining set of instructions, the method comprising: providing a plurality of decode units and a common decode unit; decoding an instruction from the remaining sets of instructions using a decode unit of the plurality of decode units corresponding to one of the plurality of instruction sets; and decoding an instruction from a number of the sub-set of common instructions from each of the plurality of instruction sets using the common decode unit.

Viewed from a third aspect, the present invention provides a data processing apparatus for processing instructions from a plurality of instruction sets, the plurality of instruction sets each sharing a sub-set of common instructions and each having a remaining set of instructions, the data processing apparatus comprising: a plurality of decode units, each of the plurality of decode units for only decoding the remaining set of instructions from a corresponding one of the plurality of instruction sets; and a common decode unit for decoding a number of the sub-set of common instructions from each of the plurality of instruction sets.

BRIEF DESCRIPTION OF THE DRAWINGS

Embodiments of the present invention will now be described with reference to the accompanying drawings in which:

FIG. 3 illustrates an arrangement of two example instruction sets sharing common instructions decodable by the arrangement shown in FIG. 2; and FIGS. 4 & 5 describes the operation of the common subset detection logic and the common subset rematch logic shown in FIG. 2.

DESCRIPTION OF PREFERRED EMBODIMENTS

Figure 1:
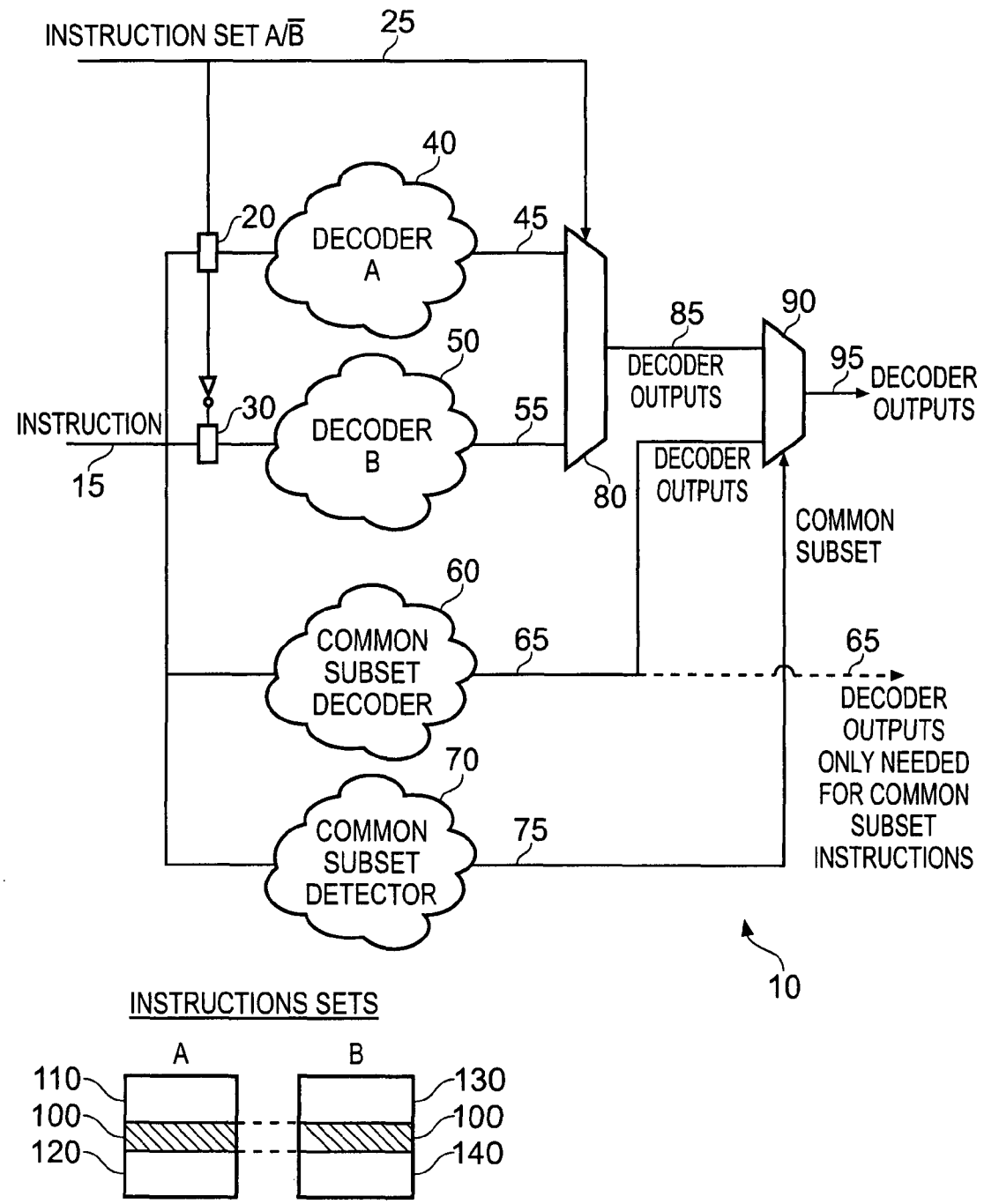
FIG. 1 illustrates an instruction decoder according to a first embodiment of the present invention.

FIG. 1 illustrates the arrangement of a decoder, generally 10, according to a first embodiment. The decoder 10 typically resides in a processing pipeline of a data processing apparatus (not shown) and comprises one of the elements within that pipeline. The decoder 10 receives, from a fetch stage (not shown), an instruction over the path 15. The instruction is provided to the separation logic 20 and 30 for use by an instruction set A decoder 40 and an instruction set B decoder 50. In addition, the instruction is provided to the common subset decoder 60 and the common subset detector 70. The separation logic 20 and 30 is typically a register with a clock enable controlled by signal 25. This arrangement isolates the instruction set A decoder 40 and the instruction set B decoder 50 from the input instruction and prevents the inputs of the instruction set A decoder 40 and an the instruction set B decoder 50 changing so that they do not consume power in the event that it is known their outputs will not be selected by a multiplexer 80.

Separation logic 20 and 30 receive a control signal over the path 25 which causes the instruction to be passed to the instruction set A decoder 40 in the event that the control signal provided over the path 25 indicates that the instruction provided over the path 15 is associated with instruction set A. In the event that the control signal provided over the path 25 indicates that the instruction provided over the path 15 is associated with instruction set B then the multiplexer 30 provides that instruction to the instruction set B decoder 50. Hence, in this way, it will be appreciated that the instructions associated with instruction set A are provided to instruction set A decoder 40, whereas the instructions associated with instruction set B are provided to the instruction set B decoder 50.

Irrespective of whether the control signal provided over the path 25 indicates that the instruction is associated with either instruction set A or instruction set B, the instruction provided with over the path 15 is always provided to the common subset decoder 60 and to the common subset detector 70.

Instruction set A and instruction set B both share a common subset of instructions 100. In this embodiment, the common instructions in instruction set A and instruction set B are encoded in exactly the same way. Hence, a common instruction in instruction set A (for example ADD r1, r2, r3) will be coded in exactly the same way as an instruction (for example ADD r1, r2, r3) in instruction set B.

Instruction set A also includes a remaining set of instructions 110, 120 which are not common to instruction set B.

Similarly, instruction set B includes a remaining set of instructions 130, 140 which are not common to instruction set A.

Instruction set A decode logic 40 includes the functionality required to decode the remaining set of instructions 110, 120 from instruction set A. However, instruction set A decode logic 40 does not contain any functionality which would enable the instructions from the common set of instructions 100 to be decoded.

Similarly, instruction set B decoder 50 includes the functionality to decode the remaining set of instructions 130, 140, but does not include any functionality which would enable it to decode the common set of instructions 100.

Instead, the common subset decoder 60 contains the functionality required to decode instructions from the subset of common instructions 100 which are common to both instruction set A and instruction set B.

Hence, when an instruction is provided over the path 15, a control signal is provided over the path 25 to the separation logic 20 and 30.

In the event that the instruction is from instruction set A then the instruction will be provided to the instruction set A decoder 40 and to the common subset decoder 60. In the event that the instruction falls within the common subset of instructions then the common subset decoder 60 will provide a valid decoded instruction over the path 65 to the multiplexer 90. The common subset detector 70 will recognise the instruction as being a valid common subset instruction and provide a control signal over the path 75 to cause the multiplexer 90 to output the decoded instruction provided by the common subset decoder 60 over the path 95 to a subsequent processing stage (such as an execute stage).

In the event that the instruction does not fall within the common subset, the common subset decoder 60 does not provide a valid decode of the instruction over the path 65 and the common subset detector 70 will not send a control signal over the path 75 to the multiplexer 90 to select path 65.

In addition, if the instruction received over the path 15 via the separation logic 20 is an instruction falling within the remaining set of instructions of instruction set A 110, 120 then the instruction set A decoder 40 will provide a decoded instruction over the path 45 to the multiplexer 80. The control signal provided over the path 25 is also provided to the multiplexer 80 and causes the output from the instruction set A decoder 40 to be selected when the control signal indicates that the instruction received over the path 15 is associated with instruction set A. Hence, the multiplexer will output the decoded instruction from instruction set decoder A 40 over the path 85 to the multiplexer 90. Because the common subset detector 70 has not recognised that the instruction provided over the path 15 relates to a common subset instruction then the signal provided over the path 75 to the multiplexer 90 causes the output from the multiplexer 80 to be selected. Accordingly, the decoded instruction from the instruction set A decoder 40 is provided over the path 95 to the subsequent stages in the pipeline.

Similarly, in the event that the instruction is from instruction set B then the instruction will be provided to the instruction set B decoder 50 and to the common subset decoder 60. In the event that the instruction falls within the common subset of instructions then the common subset decoder 60 will provide a valid decoded instruction over the path 65 to the multiplexer 90. The common subset detector 70 will recognise the instruction as being a valid common subset instruction and provide a control signal over the path 75 to cause the multiplexer 90 to output the decoded instruction provided by the common subset decoder 60 over the path 95 to a subsequent processing stage (such as an execute stage).

In the event that the instruction does not fall within the common subset, the common subset decoder 60 will not provide a valid decode of the instruction over the path 65 and the common subset detector 70 will not send a control signal over the path 75 to the multiplexer 90 to select path 65.

In addition, if the instruction received over the path 15 via the separation logic 20 is an instruction falling within the remaining set of instructions of instruction set B, 130, 140 then the instruction set B decoder 50 will provide a decoded instruction over the path 55 to the multiplexer 80. The control signal provided over the path 25 is also provided to the multiplexer 80 and causes the output from the instruction set B decoder 50 to be selected when the control signal indicates that the instruction received over the path 15 is associated with instruction set B. Hence, the multiplexer will output the decoded instruction from instruction set decoder B 50 over the path 85 to the multiplexer 90. Because the common subset detector 70 has not recognised that the instruction provided over the path 15 relates to a common subset instruction then the signal provided over the path 75 to the multiplexer 90 causes the output from the multiplexer 80 to be selected. Accordingly, the decoded instruction from the instruction set B decoder 50 is provided over the path 95 to the subsequent stages in the pipeline.

Also, in the event that separate execution logic is provided for processing common instructions from the remaining set of instructions, then the decoded instruction from the common subset decoder 60 may be provided over the path 65 directly to the dedicated execute logic for executing those instructions. In this case, the output from the common subset decoder 60 may not be provided to the multiplexer 90 or the control of the multiplexer 90 is set such that it only ever outputs decoded instructions received from the multiplexer 80.

Figure 2:
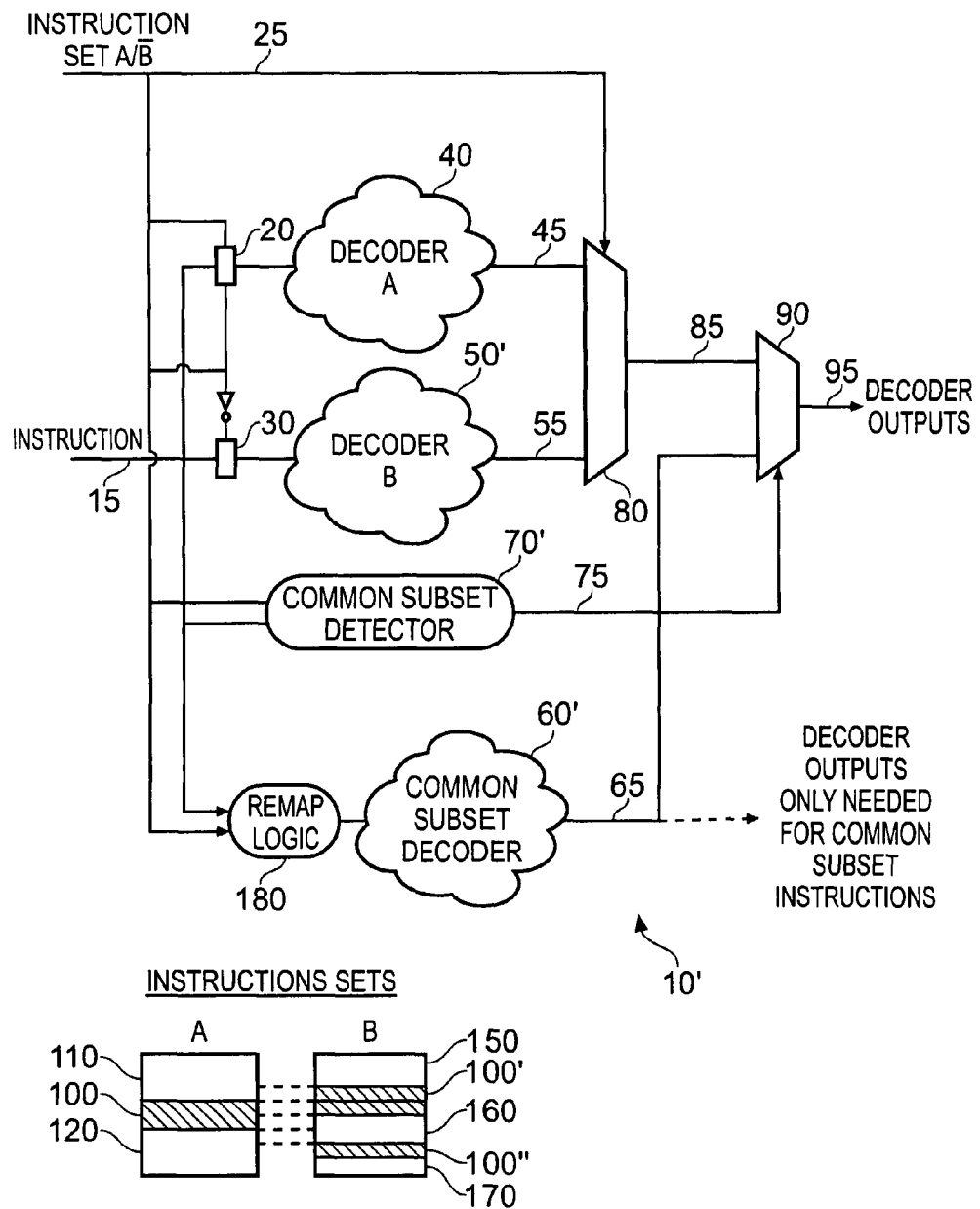
FIG. 2 illustrates a decoder according to a second embodiment of the present invention.

FIG. 2 illustrates an arrangement of a second embodiment of the decode unit. The decode unit 10' is operable to decode the common set of instruction even when those instructions are coded differently from instruction set to instruction set. For example, instruction set A contains a common subset of instructions 100 and a remaining set of instructions 110 and 120. However, the instruction set B contains a common set of instructions 100', 100" which correspond with the common instruction set 100 but which are encoded differently. Hence, a common instruction in instruction set A (for example ADD r1, r2, r3) will be coded in differently to an instruction (for example ADD r1, r2, r3) in instruction set B. This will be explained in more detail below with reference to FIG. 3. As will be clear from FIG. 2, in this example, the address range of the common subset of instructions 100 overlaps with the common subset of instructions 100', whereas there is no overlap of address range between the common subset of instructions 100 and the common subset of instructions 100".

Instruction set A also includes a remaining set of instructions 110, 120 which are not common to instruction set B.

Similarly, instruction set B includes a remaining set of instructions 150, 160, 170 which are not common to instruction set A.

Instruction set A decode logic 40 includes the functionality required to decode the remaining set of instructions 110, 120 from instruction set A. However, instruction set A decode logic 40 does not contain any functionality which would enable the instructions from the common set of instructions 100, 100', 100" to be decoded.

Similarly, instruction set B decoder 50' includes the functionality to decode the remaining set of instructions 150, 160, 170, but does not include any functionality which would enable it to decode the common set of instructions 100, 100', 100".

Instead, the common subset decoder 60' contains the functionality required to decode instructions from the subset of common instructions 100, 100', 100" which are common to both instruction set A and instruction set B, although encoded differently. The instructions provided to the common subset decoder 60' are firstly decoded by remapping logic 180 which remaps the subset of common instructions such that they are provided to the common subset decoder 60' in a commonly encoded form as will be described in more detail below.

Hence, when an instruction is provided over the path 15, a control signal is provided over the path 25 to the separation logic 20 and 30.

In the event that the instruction is from instruction set A then the instruction will be provided to the instruction set A decoder 40 and via the remapping logic 180 to the common subset decoder 60'. In the event that the instruction falls within the common subset of instructions then the common subset decoder 60' will provide a valid decoded instruction over the path 65 to the multiplexer 90. The common subset detector 70' will recognise the instruction as being a valid common subset instruction and provide a control signal over the path 75 to cause the multiplexer 90 to output the decoded instruction provided by the common subset decoder 60' over the path 95 to a subsequent processing stage (such as an execute stage).

In the event that the instruction does not fall within the common subset the common subset decoder 60' will not provide a valid decode instruction over the path 65 and the common subset detector 70' will not send a control signal over the path 75 to the multiplexer 90 to select path 65.

In the event that the instruction falls within the remaining set of instructions 110, 120 then the instruction set A decoder 40 will provide a decoded instruction over the path 45 to the multiplexer 80. The control signal provided over the path 25 is also provided to the multiplexer 80 and causes the output from the instruction set A decoder 40 to be selected when the control signal indicates that the instruction received over the path 15 is associated with instruction set A. Hence, the multiplexer will output the decoded instruction from instruction set decoder A 40 over the path 85 to the multiplexer 90. Because the common subset detector 70' has not recognised that the instruction provided over the path 15 relates to a common subset instruction then the signal provided over the path 75 to the multiplexer 90 causes the output from the multiplexer 80 to be selected. Accordingly, the decoded instruction from the instruction set A decoder 40 is provided over the path 95 to the subsequent stages in the pipeline.

Similarly, in the event that the instruction is from instruction set B then the instruction will be provided to the instruction set B decoder 50' and via the remapping logic 180 to the common subset decoder 60'. In the event that the instruction falls within the common subset of instructions then the common subset decoder 60' will provide a valid decoded instruction over the path 65 to the multiplexer 90. The common subset detector 70' will recognise the instruction as being a valid common subset instruction and provide a control signal over the path 75 to cause the multiplexer 90 to output the decoded instruction provided by the common subset decoder 60' over the path 95 to a subsequent processing stage (such as an execute stage).

In the event that the instruction does not belong to the common subset the decoder 60' will not provide a valid decoded instruction over the path 65 and the common subset detector 70 will not send a control signal over the path 75 to the multiplexer 90.

In the event that the instruction received over the path 15 via the separation logic 20 is an instruction falling within the remaining set of instructions 150, 160, 170 then the instruction set B decoder 50' will provide a valid decoded instruction over the path 55 to the multiplexer 80. The control signal provided over the path 25 is also provided to the multiplexer 80 and causes the output from the instruction set B decoder 50' to be selected when the control signal indicates that the instruction received over the path 15 is associated with instruction set B. Hence, the multiplexer will output the decoded instruction from instruction set decoder B 50' over the path 85 to the multiplexer 90. Because the common subset detector 70' has not recognised that the instruction provided over the path 15 relates to a common subset instruction then the signal provided over the path 75 to the multiplexer 90 causes the output from the multiplexer 80 to be selected. Accordingly, the decoded instruction from the instruction set B decoder 50' is provided over the path 95 to the subsequent stages in the pipeline.

Also, in the event that separate execution logic is provided for processing common instructions from the remaining set of instructions, then the decoded instruction from the common subset decoder 60' may be provided over the path 65 directly to the dedicated execute logic for executing those instructions. In this case, the output from the common subset decoder 60' may not provided to the multiplexer 90 or the control of the multiplexer 90 is set such that it only ever outputs decoded instructions received from the multiplexer 80.

The common subset detection logic 70' receives the instruction over the path 15, together with the control signal provided over the path 25 indicating whether that instruction is associated with instruction set A or instruction set B.

The common subset detection logic 70' performs the algorithm shown in FIG. 4 and when it is determined that the instruction is one within the common set of instructions outputs a control signal over the path 65.

In overview, the algorithm executed by the common subset detection logic 70' receives an indication of whether the instruction received over the path 15 relates to instruction set A or instruction set B and then outputs a match if the bit pattern of the instruction received over the path 15 matches any of those illustrated for that particular instruction set as shown in FIG. 3. Otherwise, the common subset detect logic 70' does not provide an indication that the instruction received over the path 25 is a common subset instruction.

Also, instruction remapping logic 180 is provided which performs the functionality described in FIG. 5 in order to remap the common set of instructions 100, 100', 100" into a consistent format for decoding by the common subset decoder 60.

The instruction remapping logic 180 receives an instruction over the path 15, together with the control signal over the path 25 indicating whether the instruction is from instruction set A or instruction set B.

In the event that the instruction is determined to be from the common subset of instructions 100, 100', 100" then the remapping logic 180 will output a valid remapped instruction to the common subset decoder 60 in the same format for that particular type of instruction, irrespective of whether that instruction was from instruction set A or instruction set B.

This re-mapping is achieved by manipulating the appropriate bits or portions of bits of the instructions in order that instructions from instruction set A and instruction set B provided to the common subset decoder 60 share a common format.

It can be readily seen from FIG. 3 which bits or portions of bits are shared by the same instructions from different instruction sets and which bits or portions of instruction differ between instruction sets. In this way, the common subset decoder 60 is arranged to decode instructions received in the common format from the re-mapping logic 180 irrespective of which instruction set that instruction is derived from.

Accordingly, it will be appreciated that by this technique enables the common instructions from each instruction set to be decoded by the common decode unit. Hence, the logic which would otherwise be duplicated in each of the individual decode units for each instruction set can be removed from those decode units and provided just once in the common decode unit. Accordingly, it will be appreciated that this can significantly reduce duplication between the decoder units which, in turn, reduces the amount chip area required to support decoding and reduces power consumption. Also, since the decode units are no longer required to support the decoding of such a high number of different instructions, the complexity of each decode unit can be reduced, which can result in increased performance during decode.

Although a particular embodiment of the invention has been described herewith, it will be apparent that the invention is not limited thereto, and that many modifications and additions may be made in the scope of the invention. For example, various combinations of the features of the following dependent claims could be made with the features of the independent claims without departing from the scope of the present invention.

We claim:

1. A data processing apparatus operable to process instructions from a plurality of instruction sets, said plurality of instruction sets each sharing a sub-set of common instructions and each having a remaining set of instructions, said data processing apparatus comprising:
    a plurality of decode units, each decode unit being operable to only decode said remaining set of instructions from a corresponding one of said plurality of instruction sets; and
    a common decode unit for decoding only a number of said sub-set of common instructions from each of said plurality of instruction sets, wherein said sub-set of common instructions are coded differently in each of said plurality of instruction sets and instruction remapping logic is provided to rearrange instructions from said sub-set of common instructions into a common coded format for decoding by said common decode unit.

2. The data processing apparatus as claimed in claim 1, wherein said number of said sub-set of common instructions comprises all of said sub-set of common instructions.

3. The data processing apparatus as claimed in claim 1, wherein portions of instructions in said sub-set of common instructions are coded differently in each of said plurality of instruction sets and instruction remapping logic is provided to rearrange said portions of instructions from said sub-set of common instructions into a common coded format for decoding by said common decode unit.

4. The data processing apparatus as claimed in claim 1, wherein said instruction remapping logic is provided with an indication of which of said plurality of instruction sets a common instruction belongs to.

5. The data processing apparatus as claimed in claim 1, comprising
    common sub-set detection logic operable to provide an indication of when an instruction from said sub-set of common instructions is detected.

6. The data processing apparatus as claimed in claim 5, comprising
    multiplex logic operable to receive decoded instructions from each of said plurality of decode units and from said common decode unit, said multiplex logic being operable to output a decoded instruction from said common decode unit for execution by execute logic in response to said indication.

7. The data processing apparatus as claimed in claim 5, comprising:
    multiplex logic operable to receive decoded instructions from each of said plurality of decode units;
    main execute logic coupled to said multiplex logic for executing said remaining set of instructions from each of said plurality of instruction sets; and
    common instruction execute logic coupled to said common decode unit for executing said common sub-set of instructions.

8. The data processing apparatus as claimed in claim 1, wherein said plurality of instruction sets share a plurality of sub-sets of common instructions and said data processing apparatus comprises a plurality of common decode units operable to decode a corresponding one of the plurality of sub-sets of common instructions from each of said plurality of instruction sets.

9. A method of processing instructions from a plurality of instruction sets, said plurality of instruction sets each sharing a sub-set of common instructions from each of said plurality of instruction sets and each having a remaining set of instructions, said method comprising:
    providing a plurality of decode units and a common decode unit;
    decoding an instruction from said remaining set of instructions using a decode unit of said plurality of decode units corresponding one of said plurality of instruction sets; and
    decoding using said common decode unit an instruction only from a number of said sub-set of common instructions from each of said plurality of instruction sets using a common decode unit, wherein said sub-set of common instructions are coded differently in each of said plurality of instruction sets, said method comprising rearranging instructions from said sub-set of common instructions into a common coded format for decoding by said common decode unit.

10. The method as claimed in claim 9, wherein said number of said sub-set of common instructions comprises all of said sub-set of common instructions.

11. The method as claimed in claim 9, wherein portions of instructions in said sub-set of common instructions are coded differently in each of said plurality of instruction sets, said method comprising
    rearranging said portions of instructions from said sub-set of common instructions into a common coded format for decoding by said common decode unit.

12. The method as claimed in claim 9, comprising
    providing an indication of which of said plurality of instruction sets a common instruction belongs to.

13. The method as claimed in claim 9, comprising
    providing an indication of when an instruction from said sub-set of common instructions is detected.

14. The method as claimed in claim 13, comprising
    receiving, with multiplex logic, decoded instructions from each of said plurality of decode units and from said common decode unit; and
    outputting from said multiplex logic a decoded instruction from said common decode unit for execution by execute logic in response to said indication.

15. The method as claimed in claim 13, comprising:
    receiving, with multiplex logic, decoded instructions from each of said plurality of decode units;
    executing said remaining set of instructions from each of said plurality of instruction sets using main execute logic coupled to said multiplex logic; and executing said common sub-set of instructions using common instruction execute logic coupled to said common decode unit.

16. The method as claimed in claim 9, wherein said plurality of instruction sets share a plurality of sub-sets of common instructions, said step of providing comprises providing a plurality of decode units and a plurality of common decode units and said step of decoding an instruction from said sub-set of common instructions comprises decoding an instruction from said plurality of sub-sets of common instructions using a corresponding one of said plurality of common decode units.

17. A data processing apparatus for processing instructions from a plurality of instruction sets, said plurality of instruction sets each sharing a sub-set of common instructions and each having a remaining set of instructions, said data processing apparatus comprising:

a plurality of means for decoding, each of said means for decoding only decoding for said remaining set of instructions from a corresponding one of said plurality of instruction sets;

means for commonly decoding only a number of said sub-set of common instructions from each of said plurality of instruction sets, wherein said sub-set of common instructions are coded differently in each of said plurality of instruction sets; and means for instruction remapping for rearranging instructions from said sub-set of common instructions into a common coded format for decoding by said means for commonly decoding.

* * * * *